(12) United States Patent
Melet

(10) Patent No.: US 8,876,392 B2
(45) Date of Patent: Nov. 4, 2014

(54) PAD-TYPE THRUST BEARING AND ROTARY MACHINE COMPRISING SUCH A THRUST BEARING

(75) Inventor: Luc Melet, Moirans (FR)

(73) Assignee: Alstom Renewable Technologies, Grenoble (FR)

(*) Notice: Subject to any disclaimer, the term of this patent is extended or adjusted under 35 U.S.C. 154(b) by 91 days.

(21) Appl. No.: 13/701,362

(22) PCT Filed: May 16, 2011

(86) PCT No.: PCT/FR2011/051088
§ 371 (c)(1),
(2), (4) Date: Feb. 11, 2013

(87) PCT Pub. No.: WO2011/151555
PCT Pub. Date: Dec. 8, 2011

(65) Prior Publication Data
US 2013/0142466 A1   Jun. 6, 2013

(30) Foreign Application Priority Data

Jun. 2, 2010   (FR) ..................... 10 54312

(51) Int. Cl.
| *F16C 17/04* | (2006.01) |
| *F16C 17/00* | (2006.01) |
| *F16C 17/06* | (2006.01) |
| *F16C 23/04* | (2006.01) |
| *F16C 41/02* | (2006.01) |
| *F16C 33/02* | (2006.01) |

(52) U.S. Cl.
CPC ................. *F16C 17/04* (2013.01); *F16C 17/06* (2013.01); *F16C 23/04* (2013.01); *F16C 41/02* (2013.01); *F16C 33/02* (2013.01); *F16C 2300/14* (2013.01)
USPC .......................................... 384/303; 384/312

(58) Field of Classification Search
CPC .......... F16C 17/04; F16C 17/06; F16C 23/04; F16C 33/02; F16C 41/02
USPC ......... 384/215, 220, 223, 224, 247, 248, 251, 384/253, 263, 264, 303, 306, 308, 312
See application file for complete search history.

(56) References Cited

U.S. PATENT DOCUMENTS

| 1,425,979 | A |   | 8/1922 | Kingsbury |
| 3,160,450 | A | * | 12/1964 | Gentilnomo .................. 384/308 |
| 5,205,653 | A | * | 4/1993 | Veronesi et al. .............. 384/306 |

FOREIGN PATENT DOCUMENTS

| CN | 86 1 07012 A | 10/1987 |
| DE | 4021053 A1 | 1/1992 |

(Continued)

OTHER PUBLICATIONS

Notification of Reasons for Refusal dated Apr. 28, 2014, issued in corresponding Japanese Patent Application No. 2013-512969 and an English translation thereof. (7 pgs).

(Continued)

*Primary Examiner* — James Pilkington
(74) *Attorney, Agent, or Firm* — Buchanan Ingersoll & Rooney PC

(57) ABSTRACT

A pad-type thrust bearing in which each pad rests on a volume of liquid enclosed in a cavity connected to adjacent cavities by ducts. The thrust bearing includes a number of casings, each casing delimiting the cavity and which are connected to one another by ducts. The convex casings and the ducts together form a hollow functional subassembly which is separate from the other constituent components of the thrust bearing and which delimits a liquid-filled closed volume. Each casing includes two half-shells positioned one on each side of a flexible bladder and each duct including a flexible hose inserted in a sheath.

10 Claims, 2 Drawing Sheets

(56) References Cited

FOREIGN PATENT DOCUMENTS

| | | |
|---|---|---|
| EP | 0511772 A2 | 11/1992 |
| FR | 1.141.857 | 9/1957 |
| FR | 1200013 A | 12/1959 |
| FR | 2041449 A5 | 1/1971 |
| GB | 1458660 A | 12/1976 |
| JP | 02-054944 U | 2/1990 |
| JP | 02-054944 U | 4/1990 |
| JP | 05162687 A | 6/1993 |
| JP | 11022724 A | 1/1999 |

OTHER PUBLICATIONS

Aug. 4, 2014 Chinese Office Action issued in Chinese Application No. 201180033888.3.

* cited by examiner

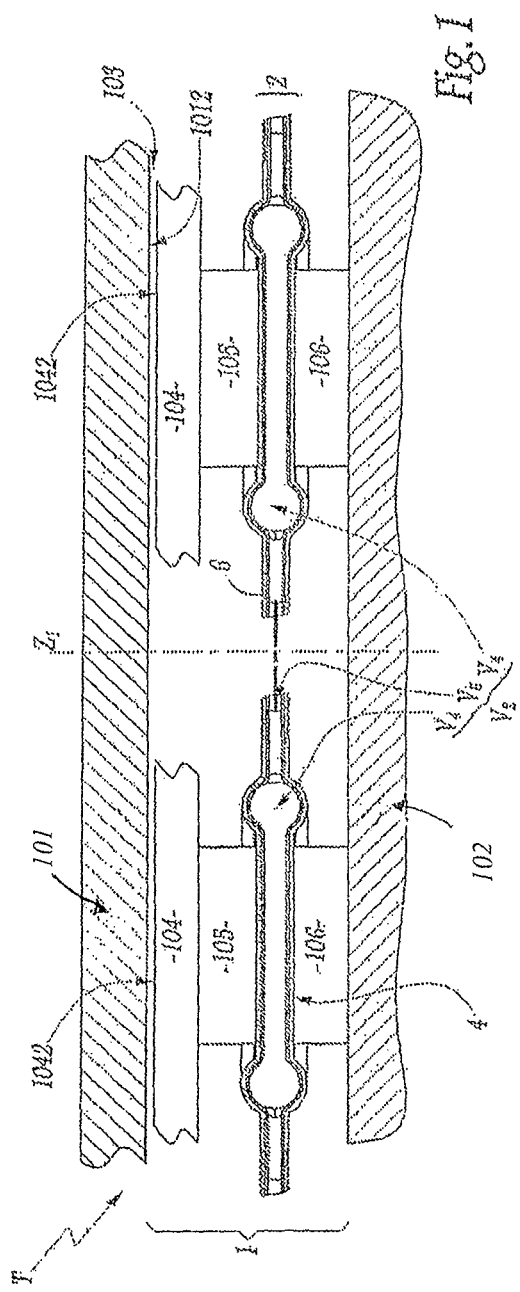
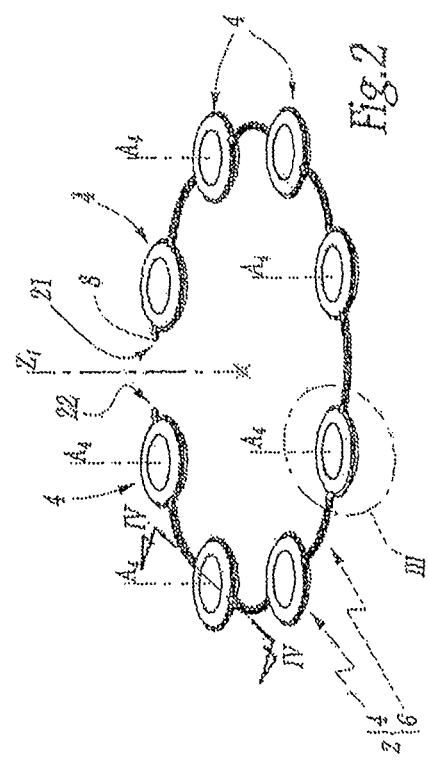

US 8,876,392 B2

PAD-TYPE THRUST BEARING AND ROTARY MACHINE COMPRISING SUCH A THRUST BEARING

CROSS-REFERENCE TO RELATED APPLICATION

This application is a National Stage entry of International Application No. PCT/FR2011/051088, filed May 16, 2011, which claims priority to French Patent Application No. 10 54312, filed Jun. 2, 2010, the disclosure of the prior applications are incorporated in their entirety by reference.

BACKGROUND OF THE INVENTION

This invention relates to a pad-type thrust bearing for a rotary machine.

It is known in FR-A-1 200 013 and FR-A-1 141 857 to provide for the distribution of the load applied on pads, belonging to a first component with a pivot connection with a second component, by means of a pad-type thrust bearing comprised of discs which cover in a sealed manner cavities connected to one another by ducts and which enclose a liquid under pressure, each pad coming to bear against a disc. In operation, when any geometric defect appears on components with a pivot connection, it is substantially instantly cancelled by a deformation of the discs generated during a transitory phase, during which a transfer of fluid between the cavities occurs, which maintains the load exerted by the pads on the discs at a substantially constant value. The procedure for filling such a device is complex as the liquid has to occupy the entire space of the cavities and of the connection ducts. In addition, this device has risks of fluid leakage and of air intrusion on contact surfaces between the components which form the cavities and the ducts. Finally, the maintenance operations are long and require stoppage of the device in order to empty the liquid, disassemble the system and fill it again, which is expensive.

DE-A-40 21 053 shows a pad-type thrust bearing in which a fluid is confined in several casings connected to one another by ducts. The unit formed by the assembly of the casings and of the ducts has risks of leakage of fluid and of air bubble intrusion on connections between the casings and the ducts.

SUMMARY OF THE INVENTION

The purpose of the invention is to simplify the installation and the maintenance of a pad-type thrust bearing and to improve the reliability of it.

To this effect, the invention has a pad-type thrust bearing in which each pad rests on a volume of liquid enclosed in a cavity connected to 5 adjacent cavities by ducts. Such a thrust bearing comprises several convex casings each on its own delimiting a cavity and connected to one another by ducts. The convex casings and the ducts together form a hollow functional subassembly which is separate from the other constituent components of the thrust bearing and which delimits a liquid-filled closed volume. According to the 10 invention, each casing comprises two half-shells positioned one on each side of a flexible bladder and each duct comprises a flexible hose inserted in a sheath.

As such, the liquid is confined in a rosary of bladders which forms the functional subassembly and which separates it from the other constituent components of the pad-type thrust bearing. A flexible rosary as a single piece simplifies the filling procedure, limits the problems of leakage as well as the risks of intrusion of air bubbles and makes it possible to reduce the duration and the complexity of the maintenance operations. Indeed, it can be transported already filled on its site of use.

According to advantageous aspects of the invention, such a pad-type thrust bearing can incorporate one or several of the following characteristics, taken in any technically allowable combination:

- The half-shells and the sheaths are made of steel, and the bladders and the flexible hoses are made of elastomer.
- The two ends of the functional subassembly are not connected together.
- The thrust bearing is provided with a sensor which measures the pressure of the liquid in the enclosed volume.
- The casings have the geometry of a thin cylinder of which the upper and lower faces are delimited by two horizontal discs in the installed situation and which has an annular bead at its periphery.
- The functional subassembly is globally circular, centred on a vertical axis in the installed situation and located in a plane perpendicular to this axis.

The invention also relates to a rotary machine comprising a rotating portion integral in rotation with a ring resting on a film of oil in contact with pads of a thrust bearing such as mentioned hereinabove, with the thrust bearing pressing against a fixed portion of the rotary machine.

BRIEF DESCRIPTION OF THE DRAWINGS

The invention shall be better understood and other advantages of the latter shall appear more clearly when reading the following description of a pad-type thrust bearing in accordance with the invention, provided by way of example and made in reference to the annexed drawings wherein:

FIG. 1 is a partial principle cross-section of a hydraulic turbine incorporating a pad-type thrust bearing in accordance with the invention;

FIG. 2 is a perspective view of a chain of deformable casings belonging to the thrust bearing shown in FIG. 1;

DETAILED DESCRIPTION OF THE INVENTION

Figure 3:
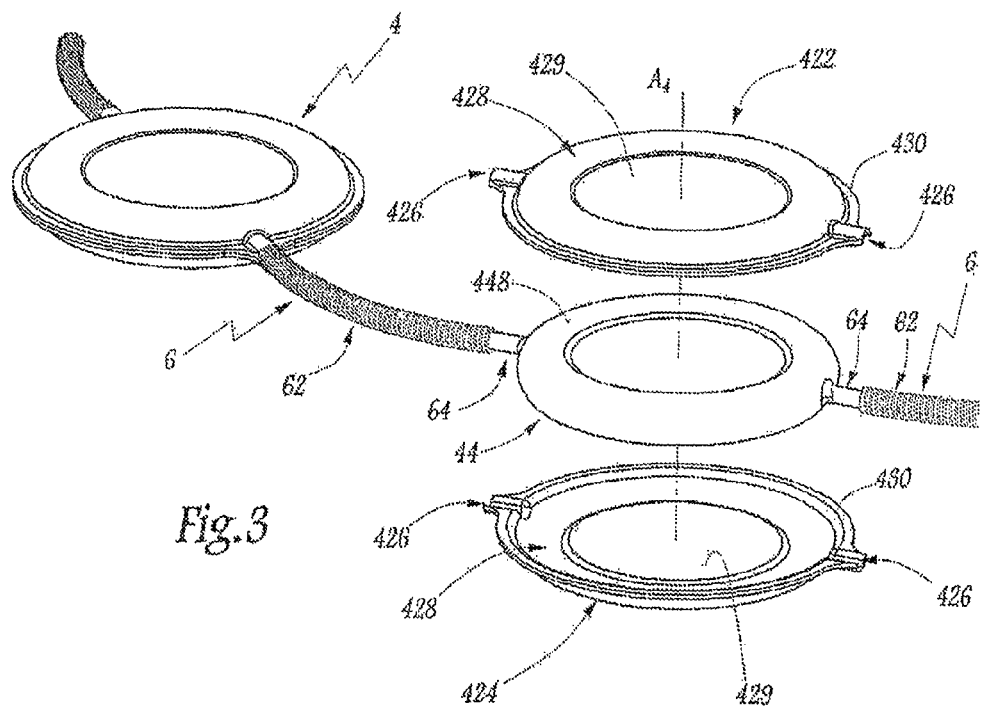
FIG. 3 is an exploded perspective view of the detail Ill in FIG. 2.

A hydraulic turbine T is partially shown in FIG. 1 and comprises a ring 101 integral in rotation with the wheel of a turbine T which is not shown and which rotates around a vertical axis $Z_1$ when the turbine T operates. The ring 101 is supported in relation to a fixed structure 102 by means of a bearing formed by a film of oil 103 defined between the lower surface 1012 of the ring 101 and the respective upper surfaces 1042 of eight pads 104 regularly distributed around the axis $Z_1$.

The pads 104 belong to a pad-type thrust bearing 1 which makes it possible to adjust the height of the various surfaces 1042 in relation to the structure 102, in order to guarantee the continuity of the film of oil 103. The thrust bearing 1 comprises, in addition to the pads 104, a load transfer block 105 and a spacer 106, the spacer 106 is positioned-ene under the load transfer block 105, and both are positioned, under each pad 104. Between each load transfer block 105 and the spacer 106 a deformable casing 4 is provided of which the inside volume $V_4$ forms a cavity. As such, the number of casings 4 is equal to the number of pads 104 of the turbine T.

A functional subassembly 2, in the shape of a chain or of a rosary, is comprised of the eight casings 4 and the seven ducts 6 that connect them to one another. This subassembly can be manipulated in a unitary manner, independent of the other parts that comprise the thrust bearing 1.

The pad-type thrust bearing 1 has for function to provide a homogeneous distribution of a load applied by the turbine T on the pads 104.

$V_6$ denotes the inside volume of a duct 6. The volumes $V_4$ and the volumes $V_6$ together constitute the inside enclosed volume $V_2$ of the chain 2. The casings 4 are convex. They each surround a volume $V_4$ by the top, by the bottom and by the sides, except on the junction with the ducts 6.

The volume $V_2$ of the chain 2 is entirely filled with a liquid 10 that can, for example, be oil, additivated water or liquid silicone. The chain 2 therefore constitutes a subassembly for the circulation of the liquid 10. In other terms, the liquid 10 can freely circulate inside the volume $V_2$ and the chain 2 can be separated from the other mechanical parts that constitute the thrust bearing 1. In the installed configuration, the chain 2 is fixed and receives, on the deformable casings 4 and by the intermediary of the pads 104, of the blocks 105 and of the spacers 106, a load coming from the ring 101.

The chain 2 is globally circular, centred on the axis $Z_1$ and located in a plane perpendicular to the axis $Z_1$. The casings have the shape of cylinders with axis $A_4$ parallel to the axis $Z_1$ of low thickness, with the radial distance between the axes $Z_1$ and $A_4$ being equal to the radius of the circle described by the chain 2. The circumference of the casings 4 is bordered by a toric bead having its axis of revolution confounded with the axis $A_4$. The ducts 6 are tubes of round section of which the longitudinal axis has a radius of curvature equal to or close to the radius of the circle described by the chain 2.

In operation, the load differences applied by the components 104 to 106 on the casings 4 are offset by small displacements of the casings 4 caused by the pressure of the liquid 10 inside the chain 2. In this way the load applied to the casings 4 is evenly distributed on each of the casings 4.

The deformable casings 4 present at each end 21 and 22 of the chain 2 are not connected together, which makes it possible to easily fill the chain 2 via one end 21, with the second end 22 being plugged. Alternatively, the chain 2 can also form a closed loop, allowing, during variations in the load, a faster displacement of the liquid 10 and therefore a faster rebalancing of the loads. 30 During the filling of the chain 2, the liquid 10 is at atmospheric pressure.

During the filling of the chain 2, the liquid 10 is at atmospheric pressure. The internal pressure of the liquid 10 results from the loading of the casings 4 when the chain 2 is in installed configuration and supports the loads applied by the pads 104.

A sensor 8 is integrated into the chain 2 in order to measure the pressure of the liquid 10 in the volume $V_2$. The sensor is, in practice, placed on the end 21 of the chain 2, with the other end 22 provided with a device not shown for filling the chain 2, such as a screw cap or a valve. The sensor 8 emits, intended for a control unit not shown, a signal representing the pressure of the liquid 10. This signal makes it possible to detect any leakage of liquid 10.

Figure 4:
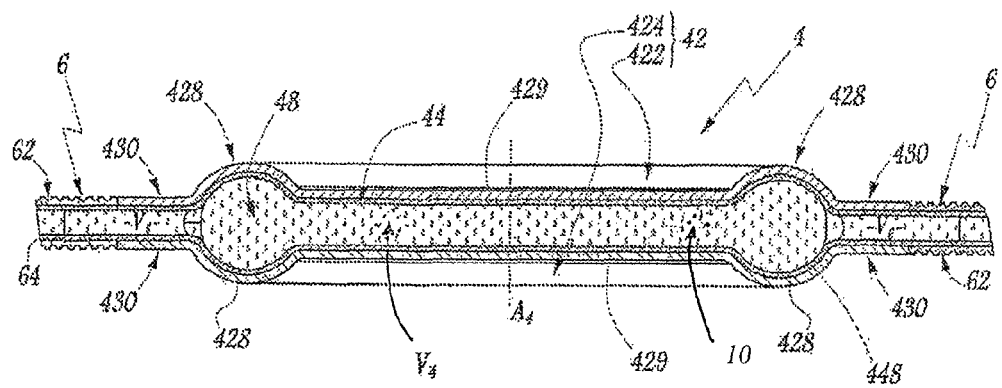
FIG. 4 is a cross-section on a larger scale according to the line IV-IV in FIG. 2.

As can be seen more particularly in FIGS. 3 and 4, each casing 4 comprises a bipartite shell 42 which comprises two rigid half-shells 422 and 424 between which is positioned a flexible bladder 44. Each duct 6 comprises a rigid sheath 62 in which is inserted a flexible hose 64.

The rigid half-shells 422 and 424 each comprise a disc 429, perpendicular to the axis $Z_1$ in installed configuration, which has a bead 428 of semi-circular section at its periphery. The half-shells 422 and 424 are as such convex. A planar annular portion 430 extends the disc 429 to the exterior of the bead 428 in order to allow for the putting into contact of each pair of half-shells 422 and 424 during the assembly of the chain 2. Connection channels 426 with radial longitudinal axis and of semi-circular section, are located in two diametrically opposite points of the planar annular portion 430 and make it possible to connect the half-shells 422 and 424 to the sheaths 62 by authorising the circulation of the liquid 10 between the flexible bladders 44 and the hoses 64.

Each bladder 44 is provided with an external radial portion 448 which hugs the inside shape of the beads 428. As such, each casing 4 has, at its periphery, an annular bead 48 filled with liquid 10 and with circular section.

In practice, the bladders 44 and the hoses 64 can be made of elastomer and the rigid half-shells 422 and 424 and the sheaths 62 made of steel.

The flexible bladders 44 have a geometry complementary to that of the surfaces opposite the half-shells 422 and 424, in such a way as to allow for their encapsulation between the half-shells.

The subassembly 2 can be constituted by the connection of the bladders 44 and of the hoses 64 provided with their sheaths 64 beforehand, then by positioning half-shells 422 and 424. This subassembly or chain 2 can be filled with liquid 10 on its site of manufacture before being shipped to its site of use where it can be manipulated as an autonomous member and positioned between the components 105 and 106 of the thrust bearing 1, without requiring filling with liquid 10.

This is advantageous not only during the installation of the turbine T but also during a maintenance operation during which the chain 2 can be replaced in a standard manner.

FIG. 2 shows a chain 2 which comprises eight casings 4 and eight pads 104. In an alternative not shown, the thrust bearing 1 can comprise a number of pads 104 that differs from eight and the chain 2 can comprise as many casings 4 as the number of pads 104.

In an alternative not shown of the invention, the longitudinal axis of the ducts 6 can have a radius of curvature that differs from the radius of the circle described by the chain 2, for example a radius of curvature greater than the radius of the circle described by the chain 2. Moreover, the section of the ducts may be non-circular.

The casings 4 define, via their respective inside volumes $V_4$, a set of cavities that exist independently of the pads 104 and of the spacers 106. In other terms, the casings 4 delimit the outline of these cavities.

Alternatively, the ducts 6 can in part not be composed of steel, but for example entirely of a thermoplastic material.

The pad-type thrust bearing 1 described hereinabove is shown for a turbine. However, the invention can apply to any rotary hydraulic machine, and even to any rotary machine other than hydraulic, for example to an alternator, a machine tool or a telescope.

The invention claimed is:

1. A pad-type thrust bearing in which each pad rests on a volume of liquid enclosed in a cavity connected to adjacent cavities by ducts, the thrust bearing comprising several casings, each casing delimiting a respective cavity and connected to one another by ducts, the casings and the ducts together forming a hollow functional subassembly which is separate from the other constituent components of the thrust bearing and which delimits a closed volume filled by the liquid, wherein each casing comprises two identical half-shells positioned one on each side of a flexible bladder and each duct comprises a flexible hose inserted in a sheath.

2. The pad-type thrust bearing according to claim 1, wherein the half-shells and the sheaths are made of steel.

3. The pad-type thrust bearing according to claim 1, wherein the bladders and the flexible hoses are made of elastomer.

4. The pad-type thrust bearing according to claim 1, wherein two ends of the functional subassembly are not connected together.

5. The pad-type thrust bearing according to claim 1, further comprising a sensor which measures the pressure of the liquid in the enclosed volume.

6. The pad-type thrust bearing according to claim 4, further comprising a sensor which measures the pressure of the liquid in the enclosed volume, and wherein the sensor is placed on an end of the functional subassembly.

7. The pad-type thrust bearing according to claim 4, wherein one end of the functional subassembly is provided with a device for filling the functional subassembly.

8. The pad-type thrust bearing according to claim 1, wherein the casings have a geometry of a cylinder, upper and lower faces of the cylinder are delimited by two horizontal discs, and each casing, has an annular bead at its periphery.

9. The pad-type thrust bearing according to claim 1, wherein the functional subassembly is shaped like a ring, the ring centred on a vertical axis and located in a plane perpendicular to the vertical axis.

10. A rotary machine comprising a rotating portion integral in rotation with a ring resting on a film of oil in contact with pads of a thrust bearing according to claim 1, with the thrust bearing pressing against a fixed portion of the rotary machine.

\* \* \* \* \*